United States Patent [19]

Ichikawa et al.

[11] 4,351,175

[45] Sep. 28, 1982

[54] METHOD OF MANUFACTURING AN ARC-LIKE FORMED PRODUCT AND EQUIPMENT FOR CARRYING OUT THE METHOD

[75] Inventors: Shigeo Ichikawa; Motonobu Ito; Makoto Aiba, all of Toyota, Japan

[73] Assignee: Taiho Kogyo Kabushiki Kaisha, Aichi, Japan

[21] Appl. No.: 187,980

[22] Filed: Sep. 16, 1980

[30] Foreign Application Priority Data

Sep. 22, 1979 [JP] Japan .................. 54-122201

[51] Int. Cl.$^3$ .................................... B21D 53/10
[52] U.S. Cl. ...................... 72/203; 72/217; 72/338; 29/149.5 DP
[58] Field of Search ............... 72/203, 204, 206, 130, 72/131, 216, 217, 218, 338; 29/149.5 C, 149.5 DP, 149.5 S

[56] References Cited

U.S. PATENT DOCUMENTS

| | | | |
|---|---|---|---|
| 2,031,982 | 2/1936 | Salzman | 29/149.5 DP |
| 2,097,692 | 11/1937 | Fiegel | 72/131 |
| 2,353,925 | 7/1944 | Pattison | 153/2 |
| 4,203,184 | 5/1980 | Gray | 29/149.5 DP |

*Primary Examiner*—Lowell A. Larson
*Attorney, Agent, or Firm*—Berman, Aisenberg & Platt

[57] ABSTRACT

An arc-like formed product, such as bearing metal, is manufactured from a strip of sheet metal, by introducing the metal strip in a tangential direction to a cylindrical forming surface of a die, bending and rolling the metal strip along the forming surface of the die into an arc shape, cutting both ends of the formed metal strip at both ends of the forming surface of the die while pressing the metal strip against the forming surface of the die in a range of at least 1/20 to ⅓ of its length, transferring the formed strip piece of metal into a coining die and coining the same.

8 Claims, 27 Drawing Figures

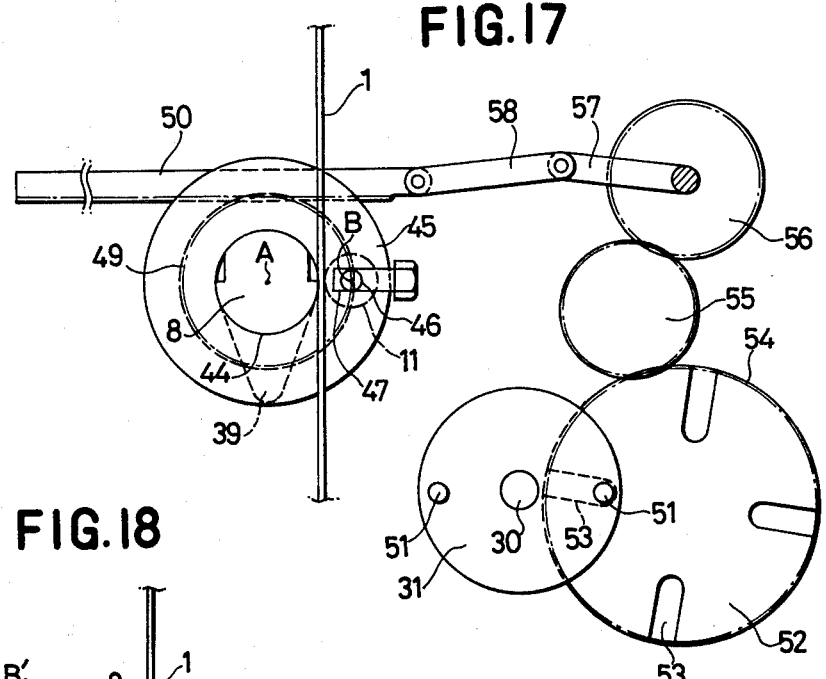
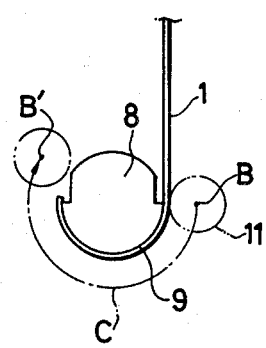
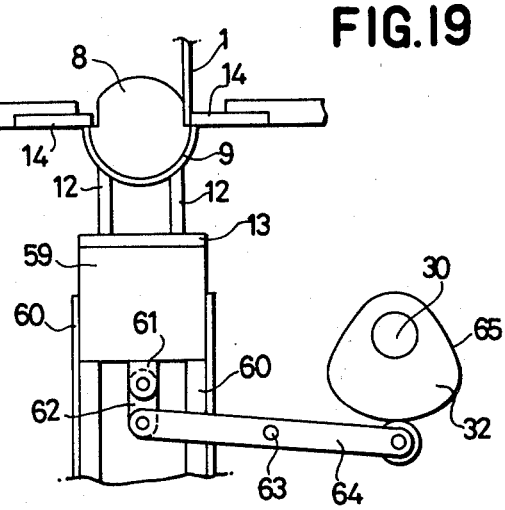

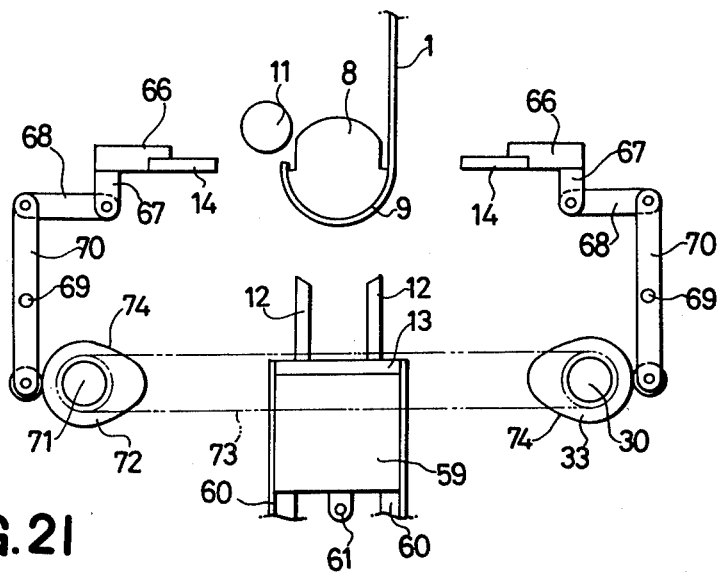
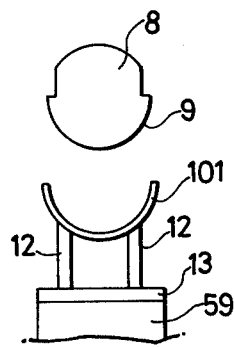
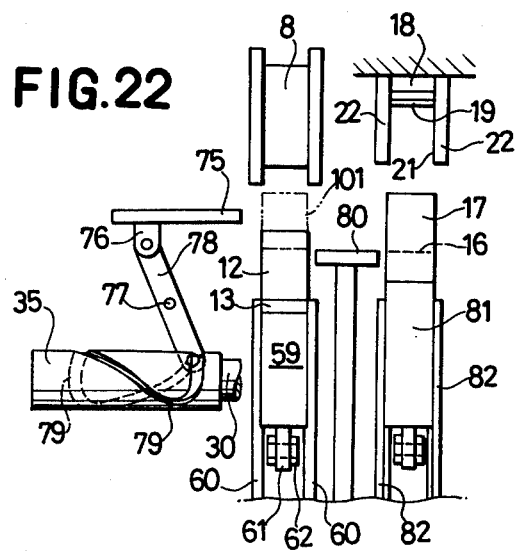

METHOD OF MANUFACTURING AN ARC-LIKE FORMED PRODUCT AND EQUIPMENT FOR CARRYING OUT THE METHOD

BACKGROUND OF THE INVENTION

The present invention relates to a method and equipment of manufacturing an arc-like formed product constituting a part of a cylinder from a band-like sheet strip of metal and is suitable for manufacturing bearings, bushings, liners or the like.

In the prior art, this kind of product has been manufactured by press forming and roll forming of sheets of steel, aluminum and copper alloy or band-like sheet strips which are formed in two layers by their metals. Generally, the press forming requires dimensional accuracy of inner and outer dies, and wear and tear of the die is substantial. Therefore, many man-hours are required for mending such a die. Also, pre-forming is required under certain circumstances before press forming. In the roll forming, when bending is performed without surrounding periphery of the sheet strip piece, cracks easily occur and the dimensional accuracy is reduced when the metal strip has a deviation in thickness. Use of bender in bending process is being tried for manufacturing this kind of product, but the dimensional accuracy has not been obtained because of spring back after processing.

SUMMARY OF THE INVENTION

The present invention is designed to manufacture, in a simple manner, an arc-like formed product constituting a part of cylindrical configuration from a band-like sheet strip of metal and is characterized by the steps of, and appropriate apparatus for, introducing a plate-like metal strip in a tangential direction with respect to one end of a cylindrical forming surface on a forming die, and rolling the strip by a die roller which has its center at a desired distance from the center of the forming surface of the forming die whereby said metal strip is rolled in a direction of thickness between the cylindrical forming surface and the pressure roller and is formed in an arc shape along the cylindrical forming surface of the forming die; pressing the formed metal strip against the cylindrical forming surface in a range of at least 1/20 to ⅓ of the length along a peripheral surface of the forming surface from both ends of the cylindrical forming surface and cutting the metal strip by a cutter portion formed on at least one end of the cylindrical forming surface, and a movable blade cooperating with the cutter portion to obtain a formed strip piece.

BRIEF DESCRIPTION OF THE DRAWING

FIG. 1 is a schematic illustration showing the step of chamfering a metal strip;

FIG. 2 is a schematic illustration showing a cut away and marking step of the metal strip;

FIG. 3 is a schematic illustration showing the step of introducing the metal strip;

FIG. 4 is a schematic illustration showing the bending of the metal strip;

FIG. 5 is a schematic illustration showing the cutting of a formed strip piece;

FIG. 6 is a schematic illustration showing the coining step;

FIG. 7 is a schematic illustration showing the step of drilling an oil hole;

FIG. 8 is a schematic illustration showing the step of chamfering an oil hole;

FIG. 9 is a schematic illustration showing the step of cutting the ends of the formed piece;

FIG. 10 is a schematic illustration showing a broaching step;

FIG. 17 is an elevational view showing a mechanism for introducing the metal strip;

FIG. 18 is a view showing an operating condition of the mechanism in FIG. 17;

FIG. 19 is an elevational view showing a mechanism for supporting the metal strip;

FIG. 20 is an elevational view showing a mechanism for cutting the metal strip;

FIG. 21 is a view showing a partial operation of the mechanism in FIG. 20;

FIG. 22 is a side view showing a mechanism for transferring and coining a formed strip piece;

FIG. 24 is an elevational view showing a bending mechanism;

FIG. 25 is an elevational view showing a mechanism for supporting and cutting the metal strip;

FIG. 26 is a side view showing a mechanism for transferring and coining a formed strip piece; and FIG. 27 is an elevational view showing the coining mechanism.

DETAILED DESCRIPTION OF THE PREFERRED EMBODIMENT

A method of producing an arc-like formed product according to the present invention will be described in relation to an embodiment for producing a bearing of half-cylindrical configuration with reference to FIGS. 1 to 10 of the accompanying drawings.

Figure 1:
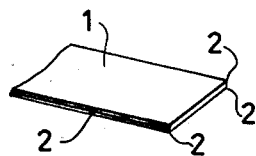
In FIGS. 1 to 10 showing steps of one embodiment of a method according to the present invention.

In this embodiment, provision is adapted to make a thin band-like metal strip 1 which is formed from a thin sheet of aluminum, kelmet or copper alloy joined entirely on a surface of a steel sheet and rolled together, the metal strip 1 being chamfered at corner position in a longitudinal direction thereof, as shown by reference numeral 2 in FIG. 1.

Figure 2:
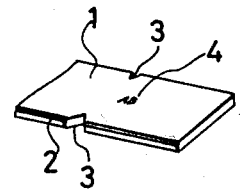
Figure 3:
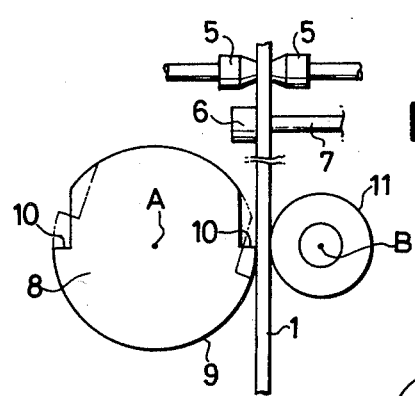

As shown in FIG. 2, the metal strip 1 is formed with a notch or cut-away portion 3 of substantially triangle shape on at least one side thereof and, further, marks 4 such as the name of the product, lot number or the like are stamped on the one side. As shown in FIG. 3, the metal strip 1 is clamped by clampers 5, 5 at a point introduced by a substantial length of a formed product, and forming of the cut-away portion 3 and stamping of the mark 4 are carried out by applying a punch 7 to the metal 1 extending along a support 6.

Reference numeral 8 in FIG. 3 shows a forming die. On a peripheral surface of die 8 is formed a cylindrical forming surface 9 corresponding to a center angle of about 200° having its center at point "A". Both end portions of the forming surface 9 are provided with cutter portions 10 and 10 formed by a radial offset or step, the cutter portions being adapted to operate as a fixed blade when cutting the formed product. A roller 11 is supported rotatably at a point "B" as a center axis of rotation on a pivotable arm (not shown) which has the point "A" as a center axis. Point "B" is spaced from point "A" for a desired distance and the distance between points "A" and "B" is so determined that it is a slightly smaller distance than the sum of the radius of the forming die 8, the radius of die roller 11 and the plate thickness of the metal strip 1.

The metal strip 1 is introduced in a tangential direction to the die 8 and the forming surface 9 at one end of the latter. When the forming die 8 is slightly rotated about point "A", as shown by a dotted line in FIG. 3, the stepped portion formed on the peripheral surface of the forming die 8 (cutter portion 10) opposes the roller 11 and, penetrates the metal strip 1 between the forming die 8 and the die roller 11, whereby the metal strip 1 may be circumscribed with one end of the forming surface 9. Thereafter, the forming die 8 is returned to its original position. Instead of rotating the forming die 8, the center axis of roller 11 may be moved on a line connecting the points "A" and "B" to penetrate the metal strip 1.

Figure 4:
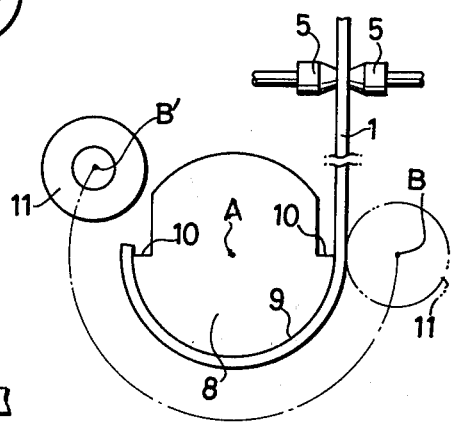

With the strip 1 kept in the clamped condition by means of clampers 5 and 5, the die roller 11 is revolved along the forming surface 9 around the point "A" while the center axis of the die roller keeps a required distance from the center "A", whereby the metal strip 1 is rolled in a direction of its thickness and bending is made along the forming surface 9. In FIG. 4 showing such a condition, the die roller is revolved around the point "A" from the point "B" for somewhat larger angle than a center angle of the forming surface 9, and a free end of the metal strip 1 is subjected to cylindrical bending in a manner so that it somewhat protrudes beyond the other cutter portion 10 of the forming surface 9. During this process, the forming die 8 is fixed to its desired position without rotation.

Figure 5:
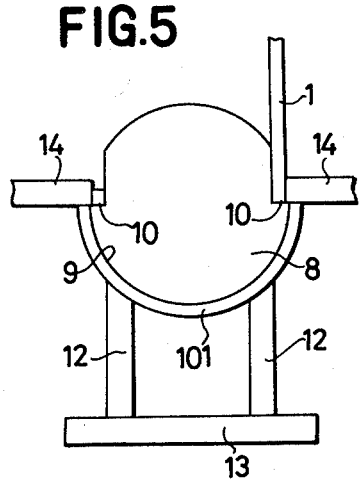

After the metal strip 1 has been formed on the forming surface 9 of the die 8, a stand 13 for supporting the strip piece is advanced toward die 8. Stand 13 is provided with supporting members 12 and 12 and has a width substantially equal to the width of the metal strip. As shown in FIG. 5, the formed metal strip is supported by upper or leading ends of the supporting members 12 and 12 and is pressed against the forming surface 9. The leading ends of the supporting members 12 and 12 are shaped to conform to the cylindrical surface of the outer face of the formed metal strip 1 (FIG. 5). Each contact point of the supporting members 12 and 12 with the formed metal strip 1 is located so that it is positioned at least 1/20 to 1/3 of a peripheral length of the forming surface 9 from both ends of the forming surface 9 of the forming die 8.

The formed metal strip 1 remains pressed by the supporting members 12 and 12 and blades 14, 14 move to engage with the cutter portions 10 and 10 of the forming die 8 to cut a formed strip piece 101 from the leading end of material metal strip 1. Although this cutting is enough to cut at least the connecting portion of the material strip piece 1 with the formed strip piece 101, the cutting may be made at both ends of the formed metal strip 1 in order to improve the accuracy of dimension.

Figure 6:
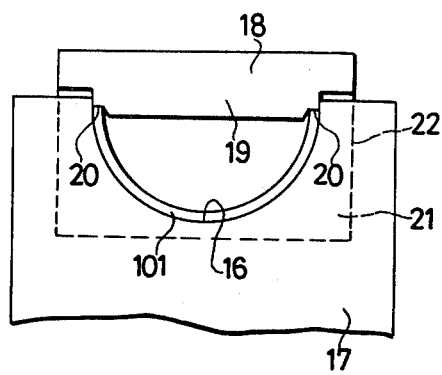

After cutting when the stand 13 for supporting strip piece having the supporting member 12 is removed away from the forming die 8, since the formed strip piece 101 formed in a half-cylindrical shape is taken out at a condition which is mounted on the leading ends of supporting members 12 and 12, the formed strip piece 101 is transferred to a coining die 17 having a cylindrical die surface 16. A press force is applied on the formed strip piece 101 in a peripheral direction by means of a plunger punch 18 which restricts its plastic deformation in a direction of width so as to obtain a bearing shell of half-cylindrical shape. FIG. 6 shows this procedure. The coining die 17 has a die surface 16 in the inner surface of a block formed in a semi-cylindrical shape and has a width substantially equal to that of the bearing shell. The plunger punch 18 has die surfaces 20 and 20 at both of the longitudinal ends of a protrusion 19 which has a width equal to that of the bearing shell abutting a peripheral end edge of the formed strip piece 101. Further, the plunger punch 18 has pendant edges 22 and 22 at its side edges opposed to die surfaces 21 and 21 at a distance corresponding to the width of the bearing shell. Accordingly, the formed strip piece 101 is transferred on to the cylindrical die surface 16 and the pendant edges 22 and 22 of the plunger punch 18 are adapted to sit on the coining die 17. Then, while both side edges of the formed strip piece 101 are restricted by die surfaces 21 and 21, the peripheral end edges of the formed strip piece are subjected to a coining process whereby the bearing shell is obtained in a semi-cylindrical shape having a desired accuracy of dimension.

A feature of the invention is that as shown in FIGS. 3 and 4, the metal strip 1 is introduced in a tangential direction at one end of the cylindrical forming surface 9 and the die roller 11, which has its center axis at a point spaced a predetermined distance from a center axis "A" of the surface 9, is moved along the latter whereby the metal strip 1 is rolled in a direction of its thickness between the forming surface 9 and the die roller 11 and is subjected to a bending process along the forming surface 9. A further feature is that, as shown in FIG. 5, the metal strip 1 formed as mentioned above is pressingly contacted to the forming surface 9 by means of the supporting members 12 for strip piece from a back surface thereof and, at the same time, is cut by cutter portions 10 and 10 formed on both ends of the forming surface 9 and movable blades 14 and 14. Therefore, when the die roller 11 rotates and at the same time revolves along the forming surface 9, a rate for reducing the thickness of the metal strip by rolling (hereinafter referred to as "Reduction of Area") is preferably in a range of 2 to 10%.

Figure 11:
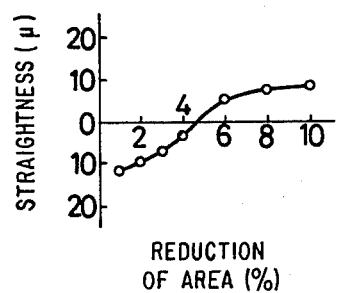
FIG. 11 is a graphical representation showing the relationship between Reduction of Area and Straightness in the bending.
Figure 12:
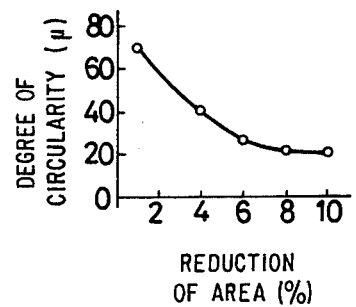
FIG. 12 is a graphical representation showing the relationship between reduction of area and Degree of Circularity.

In order to confirm the effect of bending done by the cylindrical forming surface 9 and the die roller 11, measurement was carried out for a flatness of an outer surface (a back surface of the bearing) of the formed strip piece 101 cut (cut in a surface including an axis of cylinder) in the direction of width. In this measurement, a measuring probe was moved and contacted in the direction of width of the formed strip piece 101 so as to measure its cross-sectional configuration and the measurement was carried out for a maximum dimension between a straight line connecting corner portions of both side edges of the strip piece in its cross-section and the surface of the formed strip piece, the measured value being called "Straightness". In the measured value of the Straightness as shown in FIG. 11, when the Reduction of Area is less 5% it is shown by the value of minus, that is, a configuration in which an outer surface of the formed strip piece 101 sank near its center portion in the direction of width, and when the Reduction of Area is over 5% it is shown by the value of plus, that is, a cross-sectional configuration in which the outer surface of the formed strip piece 101 rose near the center portion in the direction of width. Comparison was carried out between a configuration of the outer surface (a back surface of the bearing) of the formed strip piece 101 and a configuration of the forming surface and difference of dimension from each other was called "Degree of Circularity". In the measured value of the Degree of Circularity as shown in FIG. 12, it has been found that the smaller the Reduction of Area exists, the larger the difference of dimension exists between the configuration of the outer surface of the formed strip piece and the configuration of the cylindrical forming surface, and with increment of the Reduction of Area the difference of dimension becomes small whereby the Degree of Circularity becomes good.

Figure 13:
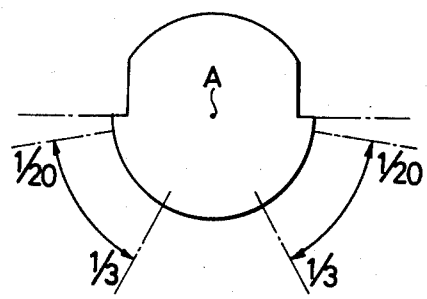
FIG. 13 is a diagram showing an abutting range of supporting member for strip piece to a forming surface of a forming die.

During the cutting process when pressing is not carried out by the supporting members 12 and 12, the cylindrical diameter of the formed strip piece 101 becomes large, that is, semi-elliptical configuration at a substantially center portion, after cutting due to spring back of the strip piece 1. However, it has been found that deformation occuring from the spring back of the strip piece presents no problem if the supporting members 12 and 13 abut a portion of the formed metal piece about a range of 1/20 to ⅛ of a peripheral length of the forming surface 9 from both ends of the cylindrical forming surface 9. The range of 1/20 to ⅛ of the peripheral length does not mean that the pressing must be carried out over all the range of 1/20 to ⅛ from both the ends of the forming surface 9 and there is no trouble if the outside ends of the supporting members 12 and 12 are abutted within the range of 1/20 to ⅛, as shown in FIG. 13. When one of the supporting members 12 and 12 does not exist or is lacking within the range, the formed strip piece 101 is deformed by spring back at a half-configuration which is being not exactly abutted. In the event the supporting members 12 and 12 are pressed at a position over ⅛ of the peripheral length of the forming surface 9 from both ends of the forming surface 9, the formed strip piece 101 will deform due to spring back.

In important manner in the invention is a coining process, and it has been found that when a rate causing a cylindrical peripheral length of the formed strip piece to reduce by means of the coining die 17 and plunger punch 18 (coining rate) is in the range of 1 to 3%, the difference of dimension is in a range of 4 to 6μ in Straightness and in a range of 10 to 8μ in Degree of Circularity. Accordingly, the Degree of Circularity becomes very good through the coining process but the coining rate is enough to 1 to 3%. Further, it has been found that omission of the coining process presents no trouble in a case where accuracy of the product is sufficient with 20 to 30μ in Degree of Circularity.

Figure 7:
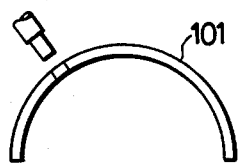
Figure 8:
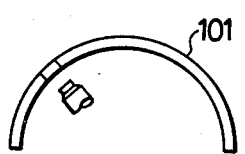
Figure 9:
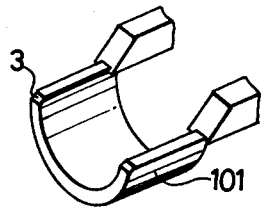
Figure 10:
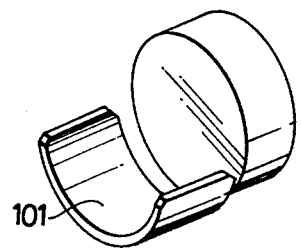

After carrying out the above processes, if necessary, the formed strip piece 101 is subjected to the step of drilling an oil hole as shown in FIG. 7, the step of chamfering the edge of the oil hole as shown in FIG. 8, the step of cutting an end surface as shown in FIG. 9, and a broaching step of an inner surface (bearing surface) as shown in FIG. 10 and, thereafter, is handled as a product. The formation of cut-away portion 3 of triangle shape as shown in FIG. 2 is, also, suitable for avoiding occurrence of burrs during the step for cutting end surface as shown in FIG. 9.

The following description relates to manufacturing equipment for carrying out the manufacturing method mentioned above.

Figure 14:
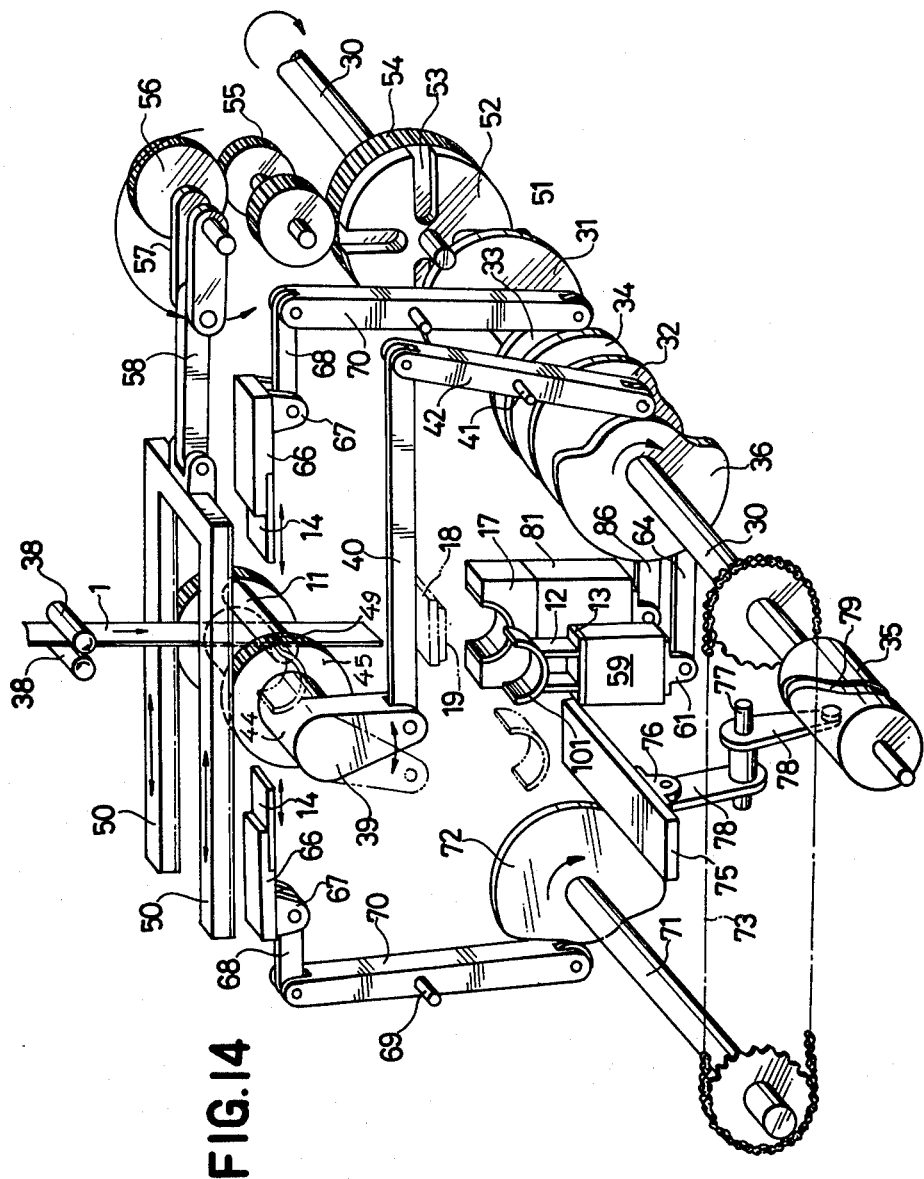
FIG. 14 is a perspective view showing substantially the whole manufacturing equipment according to the present invention.

Referring now to FIG. 14, there is shown one embodiment of such equipment, which is provided with a driving shaft 30. Fixedly connected to the shaft 30 are a cam plate 31 adapted to drive the die roller 11, a cam 32 adapted to drive the stand 13 for supporting strip piece 101, a cam 33 adapted to operate the movable blade 14, a cam 34 adapted to urge the coining die 17 against the plunger punch 18, a cam 35 for driving a pusher which introduces the formed strip piece 101 into the coining die 17, and a cam 36 for pivoting the forming die 8 as shown in FIG. 3 about the center axis "A", these arrangements being constituted to carry out the steps described with reference to FIGS. 3 to 6.

The following description will be made in relation to mechanisms for completing processes of the equipment of the embodiment and is divided into FIGS. 15 to 23 for each process.

Figure 15:
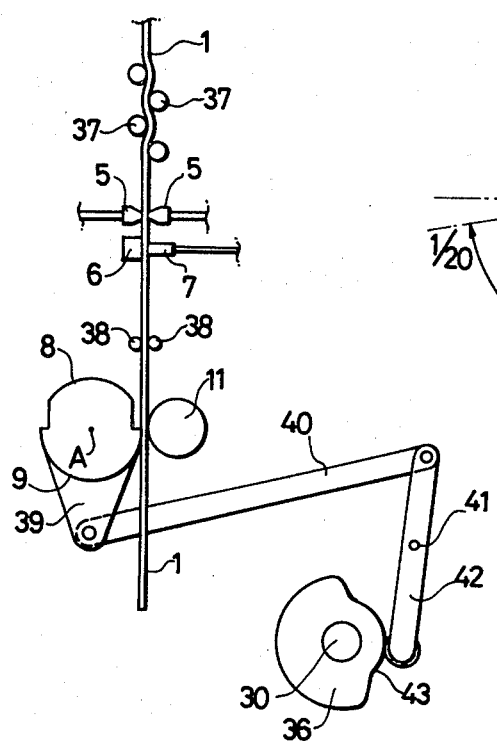
FIG. 15 is an elevational view showing a mechanism for introducing the metal strip.
Figure 16:
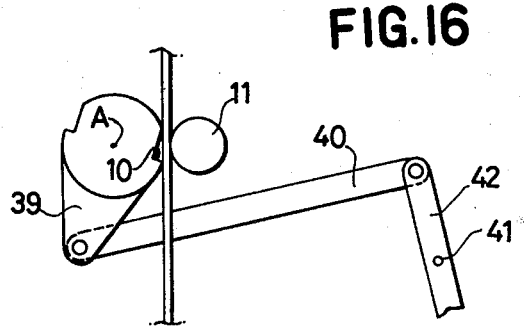
FIG. 16 is a view showing operation of the mechanism in FIG. 15.

FIG. 15 is an elevational view showing the step of introducing the metal strip 1 into the equipment. The metal strip 1, after correcting its biased curve or the like by means of a plurality of level rollers 37, is introduced between the forming die 8 and the die roller 11 through feed rollers 38. Between the latter and the level rollers 37 are located the aforementioned clampers 5, support 6 and punch 7. The forming die 8 is pivotally supported about the center axis "A" on a base (not shown). An arm 39 fixed to the forming die 8 is pivotally mounted on one end of a connecting rod 40 and the other end of the connecting rod 40 is pivotally mounted on one end of a connecting rod 42 which is pivoted at reference numeral 41 on the base. The connecting rod 42 is oscillated when its other end abuts cam surface 43 of the cam 36 and is subjected to cam driving whereby the forming die 8 is rotated and driven between a first position which causes a stepped portion forming the cutter portion 10, as shown in FIG. 16, to oppose the die roller 11 and which introduces the metal strip 1 between the forming die 8 and the die roller 11, and a second position in which the metal strip 1 is circumscribed with one end of the forming surface 9 of the forming die 8 as shown in FIG. 15.

Referring to FIG. 17, there is shown an elevational view of a mechanism in which the die roller 11 revolves about the cylindrical forming surface 9 of the forming die. Both ends of the forming die 8, positioned in its axial direction and outside of the forming surface 9, are formed in cylindrical shafts 44 which pivotally mount a pair of supporting plates 45 and 45 thereon between which the die roller 11 is rotatably supported by a pin 46. The pin 46 is introduced into a groove or bore 47 formed in the supporting plates 45 and 45 in a radial direction and is disposed to be capable of adjusting and fixing a distance between the center axis "A" of the forming die 8 and the center axis "B" of the die roller 11 through the intemediary of a shim or the like. On an outer periphery or an outside surface of the supporting plates 45 and 45 is provided a pinion gear 49 concentrically with the center axis "A" of the forming die 8 and a rack 50 is slidably supported on the base so as to engage with the pinion gear 49. Pins 51 are provided at spaced intervals on one side of the cam plate 31 and engage grooves 53 engraved at an even distance in a radial direction on one side surface of a Geneva cam 52 which is pivotally mounted on the base, whereby the Geneva cam 52 is intermittently rotated and driven by the driving shaft 30. This intermittent rotational movement of the Geneva cam 52 is constituted to allow one half rotation of gear 56 which is rotatably supported on the base through an intermediate gear 55 and a gear 54 formed on the cam 52 (FIG. 14). A crank 57, fixed to the gear 56, slides the rack through the intermediary of a connecting rod 58, and the rack 50 is moved to or fro by one intermittent rotational movement of the Geneva cam 52. By the foregoing movement of the rack 50, as shown in FIG. 18, the die roller 11 revolves along the forming surface 9 from an original position as shown by a dotted line to an extreme position as shown by a real line (the path of movement being indicated by an arrow "C") so as to effect bending of the metal strip 1. The Geneva cam 52 allows the rack 50 to reciprocate through its two intermittent rotational movements during one rotation of the driving shaft 30.

FIG. 19 shows an elevational view of a driven mechanism for the stand 13 which is fixed to an upper surface of a rectangular guide table 59, the latter being guided at four corners thereof by four standing guide rods 60 of L-shape provided on the base to be capable of moving up and down. A supporting rod 61 extends from the lower end of the guide table 59 and is connected through connecting rod 62 to an oscillating rod 64 which is pivoted at reference numeral 63 on the base. The guide table 59 is moved up and down as the rod 64 is oscillated by contact with the cam surface 65 of the cam 32 which is fixed to the driving shaft 30. By the up and down movements, the supporting member 12 of the stand 13 occupies a position in which the formed metal strip is pressed against the forming surface (FIG. 19) and a position in which it is retracted from contact with the strip 1 (FIG. 20).

FIG. 20 is an elevational view showing a mechanism for driving the movable blades 14 and 14 which are mounted on holders 66 by which the blades 14 and 14 are supported slidably to move on the base toward the cutter portion 10 of the forming die 8. Each of the holders 66 is connected to an oscillating rod 70, pivoted at reference numeral 69 on the base, through a supporting rod 67, extending from the lower surface of holder 66, and a connecting rod 68. The other end of the oscillating rod 70 associated with the holder 66 shown on the right hand side of FIG. 20 abuts cam 33 so as to directly drive the holder 66. The other end of the oscillating rod 70 associated with the holder 66 shown on the left hand side of FIG. 20 abuts cam 72 which is fixed to a shaft 71 rotatably supported on the base. As seen in FIG. 14, the shaft 71 is rotated in synchronization with the driving shaft 30 by means of a timing chain 73, and the cam 72 is formed in the same configuration as the cam 33. Accordingly, both of the movable blades 14 and 14 are moved in synchronization during one rotation of the driving shaft 30 between a retracted position which is shown in FIG. 20 and an advanced position as shown in FIG. 19, whereby the movable blades cut the formed metal strip piece in cooperation with the cutter portion 10 of the forming die 8 when the blades move to the advanced position. Reference numeral 74 shows a cam surface of the cam 33.

FIG. 21 shows the lowermost position of the stand 13 as mentioned above and it further shows that after the formed metal strip is cut and the guide table 59 is lowered by a change of diameter of cam surface 65 of cam 32, the formed strip piece 101 is supported on the leading ends of the supporting members 12, 12 of the stand 13 and is separated from the forming die 8. The supporting members 12, made from magnet steel, are convenient for holding the formed strip piece 101.

FIG. 22 shows a side view of a mechanism for transferring the formed strip piece 101 from the stand 13 to the coining die 17. A flat plate-like pusher member 75 is positioned in front of the stand 13 at the same level as the formed strip piece 101 when in its lowermost position as shown in FIG. 21, and is supported so as to be capable of sliding on the base. A supporting rod 76, extending from a lower surface of the pusher 75, is connected to one end of an oscillating rod 78 which is pivoted at reference numeral 77 on the base, and the other end of the oscillating rod 78 engages a cam groove 79 formed on the peripheral surface of the cylindrical cam 35 which is fixed to the driving shaft 30, whereby the pusher 75 is moved back and forth for one time in relation to one rotation of the driving shaft 30. In FIG. 22, the pusher 75 is in its retracted position before it pushes the forward strip piece 101 into the cylindrical die surface 16 of the coining die 17 via the upper surface of an intermediate supporting table 80 fixed to the base.

In FIG. 22, the coining die 17 is fixed on an upper surface of a rectangular guide table 81, four corners of which are guided by four upstanding L-shaped guide rods 82 which are provided on the base to be capable of moving up and down, and when the guide table 81 is moved up by a driving mechanism as described hereinafter, it moves up between the pendant edges 22 and 22 toward the plunger punch 18 fixed to the base.

Figure 23:
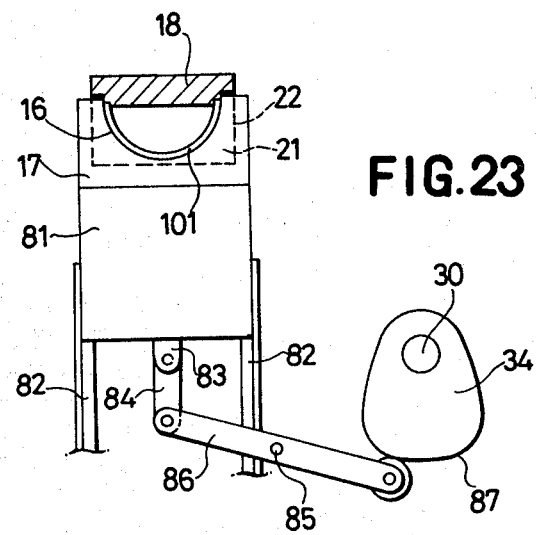
FIG. 23 is an elevational view showing the coining mechanism.

FIG. 23 is an elevational view showing a driving mechanism for moving the coining die up and down. A supporting rod 83, fixed to the lower end of the guide table 81, is connected to one end of an oscillating rod 86, pivoted at reference numeral 85 on the base, through the intermediary of a connecting rod 84. The other end of the oscillating rod 86 abuts cam surface 87 of cam 34 which is fixed to the driving shaft 30, whereby the coining die 17 is moved between two positions, that is, an uppermost position where the coining process is carried out and a lowermost position where the formed strip piece 101 is introduced therein or the formed product is taken out therefrom during one rotation of the driving shaft 30.

In the equipment of the above embodiment, each of the driving mechanism is associated with each other as follows:

(1) In relation to the rotation of the driving shaft 30, first the cam surface 43 of the cam 36 (FIGS. 15 and 16) causes the forming die 8 to oscillate and thereby allow the metal strip 1 of a constant length to be introduced between the forming die 8 and the die roller 11, and the forming die then returns immediately to its original position. The cam 36 does not rotate the forming die 8 until the driving shaft 30 starts the next rotation.

(2) When the forming die 8 returns to its original position, the pin 51 of the cam plate 31 (as seen in FIG. 17) engages one groove 53 of the Geneva cam 52 which is rotaed until the pin 51 comes out of the groove 53. The rotation of the Geneva cam 52 results in the forward movement of the rack 50 and, in turn, movement of the die roller 11 along the forming surface 9 of the forming die 8. The Geneva cam 52 does not rotate again until the other pin 51 engages a groove 53.

(3) When the forward movement of the rack 50 reaches its end, the cam surface 65 (FIG. 19) of the cam with connected linkage moves the stand 13 up and the formed metal strip is pressed against the forming surface 9 by the leading edges of the supporting members 12.

(4) While the cam surface 65 of the cam 32 with connected linkage is moving the stand 13 into its uppermost position, the cam surface 74 (FIG. 20) of the cams 33 and 72 with connected linkage pushes the movable blades 14 into their advanced position and the movable blades 14 cut the metal strip 1 and, thereafter, return immediately to the retracted position.

(5) The movable blades 14 return to their retracted position and the same time the cam surface 65 of the cam 32 causes the stand 13 to move down.

(6) When the stand 13 reaches its lowermost position, a cam groove 79 (FIG. 22) of the cam 35 with associated linkage advances the pusher 75 and, immediately after transferring the formed strip piece 101 to the coining die 17, the pusher 75 is adapted to retract.

(7) When the pusher reaches the retracted position, a cam surface 87 (FIG. 23) of the cam 34 with connected linkage immediately moves the coining die 17 toward its uppermost position and, after keeping the position for the coining, the die is lowered.

(8) The other pin 51 of the cam plate 31 engages into the groove of the Geneva cam 52, just after the cam surface 65 of the cam brings the stand 13 into the lowermost position, and rotates the cam 52 thereby causing the rack 50 to move back.

(9) One rotation of the driving shaft 30 is completed after the coining die 17 is brought into the lower position by the cam surface 97 of the cam 34 described in Paragraph (7) above and when the pin 51, engaged in the groove 53 described in Paragraph (8) above, comes out of the groove 53.

Figure 24:
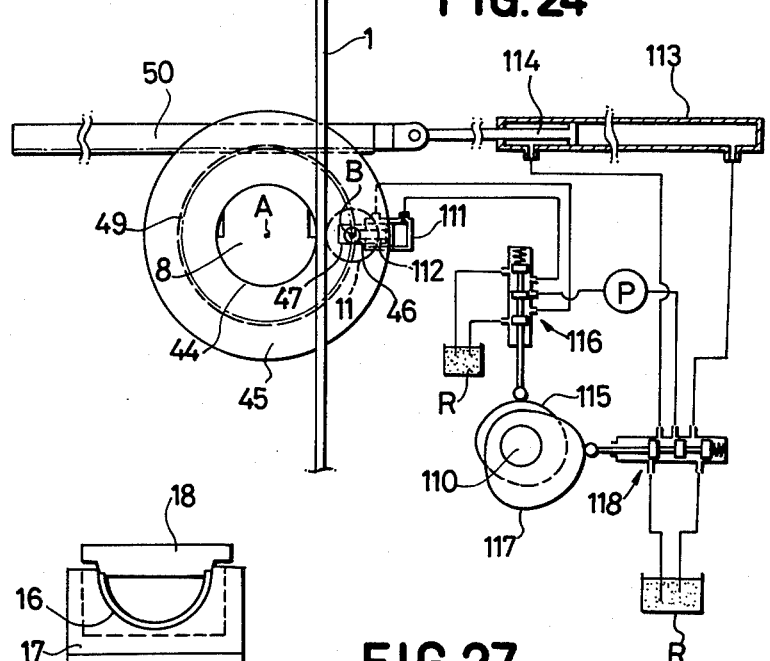
Figure 27:
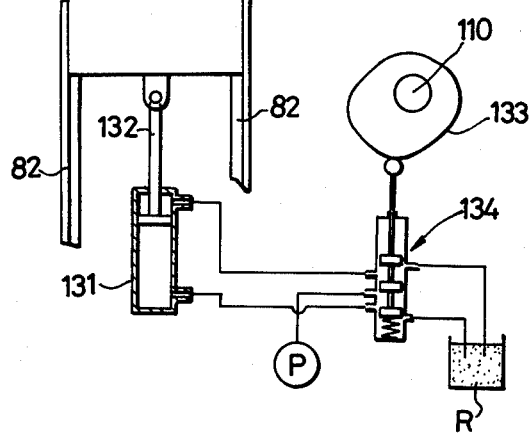

FIGS. 24 and 27 show another embodiment employing a hydraulic driving system for operating each mechanism in the embodiment of the manufacturing equipment of the invention but shows only constituents relating to the hydraulic driving system. The same reference numerals are marked for the same constituents as shown in FIGS. 14 to 23 and, therefore, the description may be abbreviated for such constituents. Further, in illustration of this embodiment, a hydraulic piston and cylinder and a hydraulic distributor valve are shown in cross-section and the illustration is made by a simple manner.

In FIG. 24 showing a bending mechanism of a sheet of metal strip 1, the die roller 11 is mounted on supporting plates 45 and 45 which are rotatably supported on the cylindrical shaft 44 of the forming die 8. Pinion gear 49, formed on an outer peripheral or outside surface of the supporting plate 45, meshes with the rack 50 whereby the die roller revolves along the forming surface 9 of the forming die 8 by the rack 50. This related movement is similar to that shown in FIG. 17.

In this embodiment, a piston rod 112 of a hydraulic cylinder 111 is connected to the pin 46 of the die roller 11 which is introduced into a groove or bore 47 of the supporting plate 45. A piston rod 114 of a hydraulic cylinder 113 is connected to the rack 50. A hydraulic distributor valve 116, actuated by a cam 115 fixed to a driving shaft 110, distributes a fluid under pressure to the hydraulic cylinder 111 to move the die roller along the groove or bore 47. Further, this embodiment is so constituted that a hydraulic distributor valve 118, actuated by a cam 117 fixed to the driving shaft 110, distributes the fluid under pressure to the hydraulic cylinder 113, thereby driving the rack 50.

The hydraulic cylinders 111 and 113 are of a simple type in which a cylinder chamber is divided by a pistin into two chambers. The hydraulic distributor valves 116 and 118 are well known and each contains an operating rod which is provided with three lands opposing ports connected to a pump "P", ports connected to both chambers of the cylinder respectively, and a spring. In FIG. 24, when the hydraulic distributor valve 116 distributes the fluid under pressure into the left chamber of the hydraulic cylinder 111, the die roller 11 retracts, and the metal strip 1 can be introduced. Fluid under pressure is distributed into the right chamber of the hydraulic cylinder 111 and the die roller 11 is returned to the predetermined position. In a condition closing the ports to the pump "P" and a reservoir "R" with lands of the hydraulic distributor valve 116, the hydraulic distributor valve 118 feeds the fluid under pressure from the pump "P" into the right chamber of the hydraulic cylinder 113, thereby driving the rack 50 forward.

Figure 25:
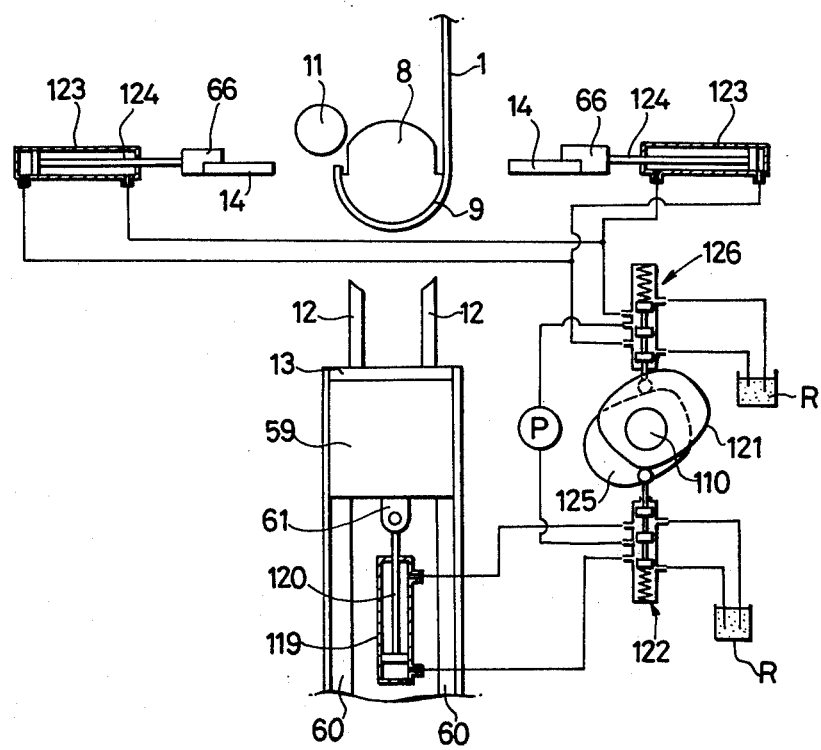

FIG. 25 shows a driving mechanism for the stand 13 and a driving mechanism for the movable blades 14. A piston rod 120 of a hydraulic cylinder 119 fixed on the base is connected to the guide table 59 which is guided by the guide rods 60 at four corners. A cam 121, fixed to the driving shaft 110, actuates a hydraulic distributor valve 122 and distributes the pressurized fluid oil to the hydraulic cylinder 119. The cam 121 keeps the lands of the hydraulic distributor valve 122 in a position closing the ports connected to the pump and the cylinder chamber until the die roller 11 completes the bending process. After the bending process is carried out, the stand 13 is raised by feeding the pressurized fluid into a lower chamber of the cylinder 119. When the supporting members 12 press the formed metal strip 1, the hydraulic distributor valve 122 is again actuated to close said ports. When cutting as mentioned hereinafter is terminated, the hydraulic distributor valve 122 is actuated to feed the pressurized fluid into the upper chamber of the cylinder 119.

Also as seen in FIG. 25, a piston rod 124 of a hydraulic cylinder 123 fixed to the base is connected to a holder 66 slidably mounted on the base. A cam 125 fixed to the driving shaft 110 actuates a hydraulic distributor valve 126 and distributes the pressurized fluid into each chamber of the hydraulic cylinder 123. After the movable blades 14 have returned to the retracted position, the cam 125 actuates the hydraulic distributor valve 126 so that each land closes the ports communicating with the pump and the cylinder chamber.

Figure 26:
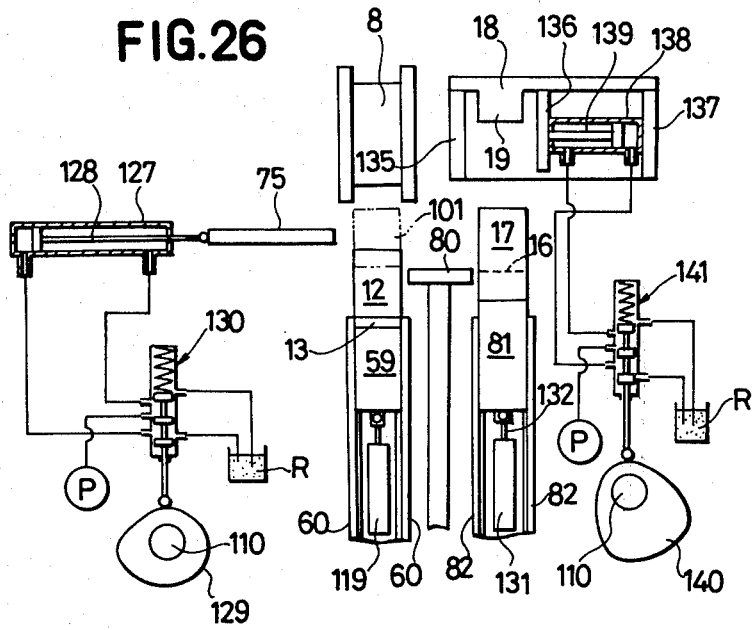
In FIGS. 24 to 27 showing another embodiment of the manufacturing equipment according to the invention.

In a transferring mechanism for the formed strip piece as shown in FIG. 26, a piston rod 128 of a hydraulic cylinder 127 is connected to a pusher 75 and a cam 129 fixed to the driving shaft 110 actuates a hydraulic distributor valve 130 and distributes the pressurized fluid into each cylinder chamber of the hydraulic cylinder 127. In FIG. 26, after the pusher 75 has returned to the retracted position, the cam 129 actuates the hydraulic distributor valve 130 so that each land closes the ports communicating with the pump and each cylinder chamber.

In a driving mechanism for moving the coining die 17 up and down as shown in FIG. 27, a piston rod 132 of a hydraulic cylinder 131 is connected to the lower end of the guide table 81 which is guided by L-shaped guide rods 82. A cam 133, fixed to the driving shaft 110, actuates a hydraulic distributor valve 134 to distribute the fluid under pressure into each cylinder chamber of the hydraulic cylinder 131. In this mechanism, the cam 133 also actuates the hydraulic distributor valve 134 so that each land closes the ports communicating with the pump and each cylinder chamber at the lowermost position of the guide table 81.

The plunger punch 18 cooperating with the coining die 17 is secured on the base, pendant edges (being indicated by reference numeral 22 in FIGS. 6 and 22) restricting both side edges of the formed strip piece 101 appear in this embodiment as side dies 135 and 136 (FIG. 26) independently from the plunger punch 18. In FIG. 26, the side dies are mounted for lateral movement in relation to the plunger punch 18 and the side die 135 is constituted integrally with a retaining piece 137. A hydraulic cylinder 138 is interposed between the retaining piece 137 and the other side die 136, and a piston rod 139 of the hydraulic cylinder 138 is constituted to push the side die 136. A cam 140, fixed to the driving shaft 110, actuates a hydraulic distributor valve 141 to distribute the fluid under pressure into each cylinder chamber of the hydraulic cylinder 138. Now, in FIG. 26, when the pressure oil is distributed to the hydraulic cylinder 131, its piston rod 132 rises to abut the protrusion 19 of the plunger punch 18 and acts to apply a compressive force of peripheral direction on the formed strip piece 101 by the die surface of the protrusion (see FIG. 6).

In this time, cam 140 actuates a hydraulic distributor valve 141 and feeds the pressurized fluid into the right cylinder chamber of the hydraulic cylinder 138. In this case, the side die 136 is apart from the retaining piece 137 by action of the hydraulic cylinder 138 and, since the side die 135 and the retaining piece 137 are constituted integrally with each other, the side dies 135 and 136 are forcibly contacted to both side surfaces of the coining die 17 whereby both side edges of the formed strip piece 101 are restricted on the cylindrical die surface 16 of the die 17.

The same relevancy appears in this embodiment as was described in paragraphs (1) to (9), above, in relation to the driving mechanisms of the previously mentioned embodiment.

In the above embodiment of FIG. 26, because all of the steps, such as the bending using the pressure roller, the lifting of the stand for supporting metal strip, the cutting, transferring and coining of the formed strip piece are constituted to be performed by the operation of the hydraulic cylinders through the fluid under pressure distributed by the hydraulic distributor valves, the power required for each mechanism in the forming steps of the metal strip may be fed efficiently and economically by the hydraulic cylinder suitable for each mechanism. The fluid under pressure distributed into each hydraulic cylinder may be controlled at one position and since each of the hydraulic distributor valves does not require large driving power, the driving shaft 110 does not necessitate large torque and, rather, it is preferable to rotate at a constant speed. Further, since it is enough to exactly fix the cams for driving each of the hydraulic cylinders to the driving shaft so as to meet the time progress of each step, the equipment may be very compact.

What is claimed is:

1. A method of manufacturing an arc-like formed product comprising the steps of: introducing a plate-like metal strip piece in a tangential direction with respect to one end of a cylindrical forming surface on a forming die and moving a die roller along said cylindrical forming surface, said die roller having its center at a desired distance apart from the center of said forming surface of said forming die whereby said metal strip is rolled in a direction of thickness between said cylindrical forming surface and said die roller and is formed in an arc shape along said cylindrical forming surface of said forming die;

pressing said metal strip formed along said cylindrical forming surface of said forming die against said cylindrical forming surface in a range of at least 1/20 to ⅓ of the length of said forming surface along its peripheral surface measured from both ends of said cylindrical forming surface;

and cutting the metal strip by a cutter portion formed on at least one end of said cylindrical forming surface of said forming die and by a movable blade cooperating with said cutter portion so as to obtain a formed strip piece.

2. A method of manufacturing an arc-like formed product comprising the steps of: introducing a plate-like metal strip in a tangential direction with respect to one end of a cylindrical forming surface on a forming die and moving a die roller along said cylindrical forming surface, said die roller having its center at a desired distance apart from the center of said forming surface of said forming die whereby said metal strip is rolled in a direction of thickness between said cylindrical forming surface and said die roller and is formed in an arc shape along said cylindrical forming surface of said forming die;

pressing said metal strip formed along said cylindrical forming surface of said forming die against said cylindrical forming surface in a range of at least 1/20 to ⅓ of the length of said forming surface along its peripheral surface measured from both ends of said cylindrical forming surface;

cutting the metal strip by a cutter portion formed on at least one end of said cylindrical forming surface of said forming die and by a movable blade cooperating with said cutter portion so as to obtain a formed strip piece;

transferring said cut and formed strip piece to a coining die having a cylindrical forming surface in an inner surface thereof;

and pressing end edges of both ends of said formed strip piece in said die by the latter whereby the outer surface of said formed strip piece is formed by said cylindrical forming surface of said coining die.

3. Equipment for manufacturing an arc-like formed product from a metal step comprising a forming die having a cylindrical forming surface and a cutter portion of steplike cut away portion formed on at least one end of said forming surface;

a die roller supported by a pivotable arm which rotates about a center of said cylindrical forming surface of said forming die at a desired distance spaced from said cylindrical forming surface of said forming die whereby said metal strip is rolled and formed between said cylindrical forming surface of said forming die and the peripheral surface of said die roller;

a supporting member for said strip piece adapted for movement toward said cylindrical forming surface of said forming die and having leading ends adapted to be positioned adjacent said surface in a range of at least 1/20 to ⅓ of the length of the peripheral surface of said forming surface measured from both ends of said cylindrical forming surface;

a movable blade adapted for movement toward the peripheral surface of said forming die and adapted to cut the metal strip in cooperation with said cutter portion of said forming die;

said supporting member for strip piece being adapted to advance and to press and support the formed strip piece against said cylindrical forming surface after said die roller moves along said cylindrical forming surface of said forming die and the rolling and forming of the metal strip is completed by said forming surface and said die roller;

said movable blade being adapted to advance while said supporting member for said strip piece advances to press and support the formed strip piece, and to cut said formed strip piece in cooperation with said cutter portion of said forming die; and each of said movements being associated with and driven by a driving shaft.

4. Equipment for manufacturing an arc-like formed product from a metal strip comprising a forming die having a cylindrical forming surface and a cutter portion of steplike cut away portion formed on at least one end of said forming surface;

a die roller supported by a pivotable arm which rotates about a center of said cylindrical forming surface of said forming die and moved along said cylindrical forming surface at a desired distance spaced from said cylindrical forming surface of said forming die whereby said strip piece is rolled and formed between said cylindrical forming surface and the peripheral surface of said die roller;

a supporting member for said strip piece adapted for movement toward said cylindrical forming surface of said forming die and having leading ends adapted to be positioned adjacent said surface in a range of at least 1/20 to ⅓ of the length of the peripheral surface of said forming surface measured from both ends of said cylindrical forming surface;

a movable blade adapted for movement toward the peripheral surface of said forming die and adapted to cut the metal strip in cooperation with said cutter portion of said forming die;

a coining die having a cylindrical forming surface in an inner surface thereof;

means for transferring the formed strip piece supported on said supporting member to said coining die;

a plunger punch which has a die surface opposing both ends of said inner forming surface of said coinining die;

means for moving said coining die and said punch toward each other;

said supporting member for said strip piece being adapted to advance and to press and support the formed strip piece against said cylindrical forming surface of said forming die after said die roller moves along said cylindrical forming surface of said forming die and the rolling and forming of the metal strip is completed by said forming surface and said die roller;

said movable blade being adapted to advance while said supporting member for said strip piece advances to press and support the formed strip piece, and to cut said formed strip piece in cooperation with said cutter portion of said forming die; and each of said movements being associated with and driven by a driving shaft in interlocking relation with a rotation of the latter.

5. A method of manufacturing an arc-like product comprising the steps of:

inserting a piece of bendable material into forming means provided with a forming surface;

forming said material into an arc, having a convex surface, along said forming surface;

pressing said material against said forming surface in the range of substantially 1/20 to ⅓ of the length of said forming surface measured from the ends thereof;

cutting said material into a selected length; and applying opposing, compressive forces to the ends of said cut material and to the convex surface of said cut material.

6. The method of claim 5 wherein after said cutting step, the cut material is transferred to a coining die before the opposing compressive forces are applied.

7. Apparatus for manufacturing an arc-like product from strip material comprising:

means for forming said material into an arc having a convex surface;

means for pressing said material against said forming means positioned adjacent the portion of said forming means located in the range of substantially 1/20 to ⅓ of the length of said forming means, measured from the ends thereof;

means for cutting said material into a selected length; and means for applying opposing, compressive forces to the ends of said cut material and to the convex surface of said cut material.

8. The apparatus of claim 7, and means for transferring said cut material from said means for cutting to said means for applying opposing compressive forces.

* * * * *